Feb. 7, 1939.  L. A. JOHNSON  2,146,677
FLUID SEAL
Filed Aug. 5, 1936
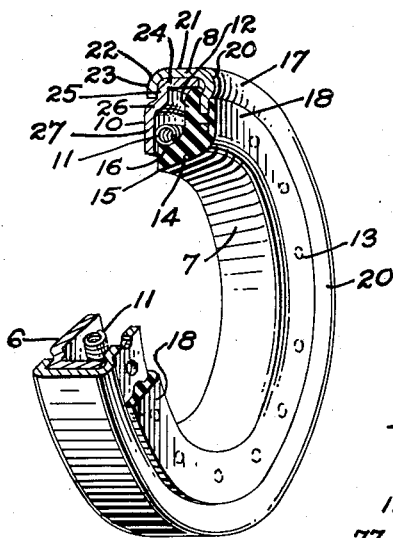
Fig.1.
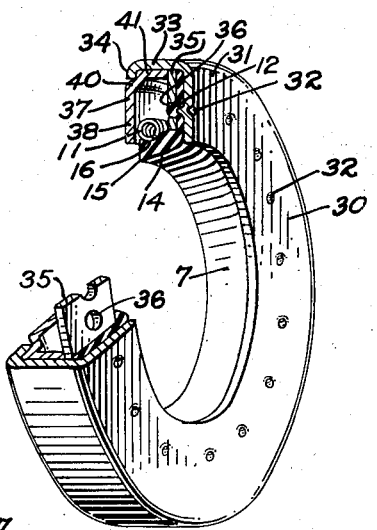
Fig.2.
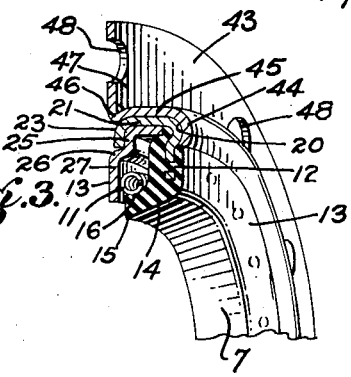
Fig.3.
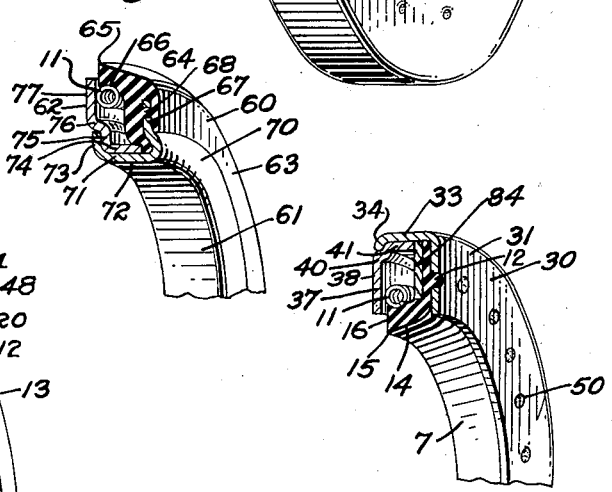
Fig.6.
Fig.4.
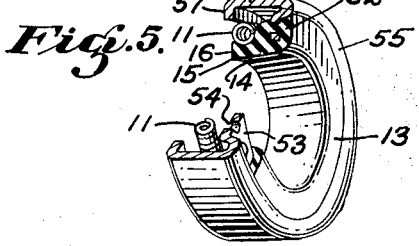
Fig.5.
INVENTOR.
Lloyd A. Johnson
BY A. Donham Owen
ATTORNEY.

Patented Feb. 7, 1939

2,146,677

UNITED STATES PATENT OFFICE 2,146,677

FLUID SEAL

Lloyd A. Johnson, Hillsborough, Calif., assignor to National Oil Seal Co., Oakland, Calif., a corporation of Nevada Application August 5, 1936, Serial No. 94,326

1 Claim. (Cl. 288—1)

My invention relates to improvements in fluid seals.

The various types of fluid seals in use at the present time have objectionable features. In those using felt for the sealing member difficulty is soon encountered due to the fact that felt is oil permeable, developing a capillary action drawing oil into the region which is to be kept oil free. On automobiles where it is necessary to keep oil from passing from the differential through the housing around the axle to the brakes on the rear wheels, and other similar installations, it has been found that felt, because of its wick-like action, draws oil and is unsatisfactory.

Sealing units using leather for the sealing member, though at present widely used, have been found unsatisfactory in many respects. For instance, in the matter of securing the sealing member in the cage in a leak-tight, non-rotative fit. Also, leather is susceptible to the action of oil and gradually becomes softened and saturated with oil. In those using spring means to hold the leather sealing lip in contact with an axle, as the leather becomes softer and more pliable a greater sealing surface is brought into contact with the moving part, resulting in greater frictional resistance and rapid wearing out of the leather sealing edge, as well as "scoring" of the shaft. Leather is not uniform in texture, therefore it is necessary to have a greater sealing edge in contact with a movable shaft to insure a positive seal. This, too, results in greater frictional resistance which is a serious problem in sealing low powered units. Finally, the lack of uniformity of leather presents serious manufacturing problems in quantity production.

Composition fluid seals made wholly of rubber or compositions with similar characteristics, in which reenforcing means are embedded, near the outer rim, possess many disadvantages. In use it has been found that the units expand as a result of frictional heat, this expansion urging more of the sealing lip onto the movable shaft, thereby developing greater frictional resistance. This in turn develops more heat, resulting in still greater expansion, until the unit as a whole becomes compressed beyond the elastic limit of the material. Upon cooling it shrinks away from the housing, destroying the peripheral oil-tight fit at that point and allowing oil to leak out. "Cold flow" is also a problem with this type of seal.

These and other defects found in the conventional type of fluid seals present a difficult problem in the newer and faster automobiles and other machinery having parts which now operate with so much higher shaft speeds.

It is therefore an object of my invention to combine the good features of the metal encased seal and of the composition seal, to provide a fluid seal having a metal or rigid heel portion and a sealing lip made of composition material in which the bearing area of the sealing lip on the movable part is small, resulting in low frictional resistance and cool operation.

Another object is to provide a fluid seal in which the parts are bonded together making leak-proof joints between the sealing member and its heel portion.

Another object is to provide a fluid seal having a composition sealing edge which will not develop greater frictional resistance as the unit becomes worn or heated, due to the control effected by the heel portion.

Another object is to provide a fluid seal which is free to expand as a result of frictional heat without exerting substantial additional pressure on the sealing lip.

Another object is to provide a fluid seal having a self-sustained press fit allowing a smaller over-size diameter due to its greater strength.

Other objects and advantages will be apparent from the following description and claim.

In the drawing forming a part of this specification:

Fig. 1 is a perspective view of a sealing unit with a section removed to show the arrangement of the component parts;

Fig. 2 is a modified form;

Fig. 3 is a modified form adapted to be "bolted on" to a housing;

Figs. 4 and 5 are further modifications; and

Fig. 6 shows an external form of seal.

In Fig. 1 is shown a seal comprising broadly a composition sealing portion 7, outer metal cup or heel 8, inner cup 10 and garter spring 11. The composition body portion 7 includes radial portion 12 having outer surface 18 and axial portion 14 terminating in sealing lip 15, and spring retaining groove 16.

The outer cup or heel 8 consists of radial wall 17 having perforations 13, radius 20, peripheral sealing face 21, radius 22, and spun over portion 23. It may be of metal or other hard substance.

The inner cup 10, which may be of metal or composition, consists of circumferential wall 24, inset radial wall 25, radius 26, and radial wall 27.

The composition body portion 7 is formed in a mold, and it is preferable to use an oil resisting composition, such as "Duprene". The composition can be varied to suit the material being sealed.

Outer cage 8 is placed in the mold before the composition is added. It is preferable to sandblast radial wall 17 of cage 8 and apply a coat of cement which will insure a good bond between the composition and the metal. Next the composition is placed in the mold and the mold closed. Under pressure the composition material will flow into openings 13 of wall 17 and tie or bond the parts together. The mold is also shaped to form spring receiving groove 16. As the composition cools it shrinks approximately one per cent which further tends to make the composition material embrace the metal.

When cooled, it is removed from the mold and garter spring 11 placed in groove 16. The inner cage 10 is placed within outer cage 8 and flange 23 of outer cage 8 is spun over against inset radial wall 25 of the inner cage, firmly holding the parts together. Radial portion 27 retains garter spring 11 in position and protects the composition sealing lip from injury by movable parts. Radial ridge 20 projects outwardly beyond the side 13 of the composition part of the seal and provides a protecting edge for the wall 13.

In Fig. 2 a modified form of construction is shown in which the rubber composition material is bonded to spacing washer 35. In manufacturing this type, the spacing washer 35, which may be of metal or composition material is positioned in the mold with the composition. The composition will adhere to the side of washer 35 and also flow into holes 36 to strengthen the bond between the parts. The outer cage 30 consists of radial wall 31, having a series of indentations 32, circumferential portion 33 and spun over lip 34. Inner cage 37 consists of radial wall 38, offset 40, and circumferential portion 41.

In assembling this unit, the composition radial portion 12 and spacing washer 35, which are bonded together, are placed within outer cage 30 and garter spring 11 is placed in groove 16. Inner cage 37 is then placed within outer cage 30 and portion 34 is spun over, securing the parts together firmly. Circumferential portion 41 of the inner cage abuts against spacing washer 35, pressing it and the radial portion of the composition material firmly against the bottom of cage 30. The inwardly disposed indentations 32, preferably non-perforate, located in wall 31, embed themselves in the composition material and serve to anchor it against rotation. Washer 35 with its bonded sealing member is capable of being used alone in this form in a housing by press-fitting the washer therein, or by means of a gland.

In Fig. 3 is shown a sealing unit adapted to be bolted on the end of a housing instead of being press-fitted within the housing. The parts of this seal are the same as shown in Fig. 1 with external metal member 43 added, which fits over outer cage 8 of the seal. External member 43 includes turned over ridge 44, circumferential portion 45, downwardly disposed dinks 46 and radial wall 47 in which are bolt holes 48. The seal unit of Fig. 1 is press-fitted into external metal member 43, forming an oil-tight fit between circumferential part 45 of the external member and circumferential part 21 of the seal's outer cage. Downwardly disposed dinks 46 extend a short distance down over spun over portion 23 of the seal's outer cage 8, to hold it in place. Radial wall 47 is adapted to be bolted on the end of a housing and form the end wall of said housing.

Fig. 4 shows another modified form of seal similar to the type described in Fig. 2, except that the composition radial portion 12 is bonded to the inner side of radial wall 31 of the outer cage 30. A series of holes 50 are located in this wall 31 of the outer cage and aid in securing a good bond. Washer 84 is put in place against composition sealing member 12. Garter spring 11 is placed in groove 16. Inner cage 37 is then placed within outer cage 30 and portion 34 of the outer cage is spun over, holding the parts firmly together. Circumferential portion 41 of the inner cage presses against washer 84, pressing it firmly against the radial portion 12 of the composition material.

Fig. 5 shows another modified form of seal consisting of metal cage or heel 51, composition part 52, and garter spring 11. The metal cage 51 includes radial portion 53, with holes 54, radial ridge 55, peripheral portion 56, and small inwardly extending radial portion 57. In this type the composition material will flow on both sides of radial portion 53 into holes 54. It will adhere to the sides of radial portion 53 and the composition which has flowed through holes 54 further strengthens the bond between the composition material and metal. Radial ridge 55 extends out slightly beyond the plane of side 13 of the composition material and provides a protecting shoulder. Small inner radial portion 57 extends out beyond the plane of the composition sealing lip 15, forming a thrust surface protecting the sealing material from moving parts within a housing. While I mention heel 51 as made from metal, it may in some cases be made from compsition of a fair degree of hardness.

Fig. 6 shows a seal similar to Fig. 1 in which the parts are reversed forming a unit in which the composition sealing lip is on the outer periphery and the metal parts adapted for press-fitting on a shaft.

In the drawing (Fig. 6) the unit is shown comprising composition sealing portion 60, outer metal cup 61, inner metal cup 62 and an expanding type garter spring 11. The composition member consists of radial portion 63, body portion 64, sealing lip 65 and spring groove 66. The outer cage consists of radial part 67, having openings 68, radial ridge 70, axial portion 71, having inner periphery 72 and spun over part 73. Inner cage 62 consists of circumferential part 74, inset radial part 75, offset 76, and thrust surface 77. The composition material will adhere to both sides of radial wall 67 and flow through holes 68, forming a secure bond between the composition and metal as explained previously. Garter spring 11 fits groove 66. Inner cage 62 is placed within outer cage 61 and portion 73 is spun over. Radial ridge 70 of the axial metal cage 61 extends outwardly beyond the plane of radial wall 63 of the composition material and forms a protecting shoulder for the composition material. Radial wall 77 secures garter spring 11 against removal and provides a thrust surface protecting the seal from moving parts within a housing.

The external type of seal shown in Fig. 6 is press-fitted onto a shaft and the inside surface 72 of the axial portion 71 of the metal cage makes an oil tight joint between the axle and cage. Garter spring 11 urges the composition sealing portion outwardly, pressing the sealing lip 65 against the inner wall of the housing to form an oil tight seal. The composition sealing portion is free to compress inwardly against the action of garter spring 11 as the result of any expansion due to heat being generated.

By using an oil resisting rubber composition material, such as "Duprene", which is consistent in texture, only a short shaft contacting surface is required to provide an effective seal. "Duprene" is unaffected by oil and does not become soft and flabby after being soaked in oil, consequently the garter spring cannot pull the long axial portion of the sealing edge onto the shaft and thereby develop greater frictional resistance. The heel portion also functions to control the sealing lip. Since the frictional resistance is low due to the short shaft contacting surface, any expansion due to heat generated by friction is slight.

While I have illustrated and described some forms of my invention, it is obvious that the design may be varied and still be within the spirit of the invention as defined in the appended claim.

What I claim is:

An oil seal of the type adapted for insertion to seal the annular space between the shaft and a bore in a housing, comprising a cup member having a peripheral portion and an axially inwardly offset radial flange, a molded resilient sealing member bonded to both sides of said radial flange at said offset so that its outer radial face lies within the radial plane of the cup bottom where it bends inward to form said offset, whereby said molded material is protected from wear by contact with adjacent moving parts.

LLOYD A. JOHNSON.